United States Patent
Bennah et al.

(10) Patent No.: US 9,372,089 B2
(45) Date of Patent: Jun. 21, 2016

(54) MONITORING SUGGESTED ROUTES FOR DEVIATIONS

(71) Applicant: International Business Machines Corporation, Armonk, NY (US)

(72) Inventors: Albert D. Bennah, Cary, NC (US); William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/293,019

(22) Filed: Jun. 2, 2014

(65) Prior Publication Data

US 2015/0345960 A1 Dec. 3, 2015

(51) Int. Cl.
*G01C 21/00* (2006.01)
*G01C 21/34* (2006.01)

(52) U.S. Cl.
CPC ...................................... *G01C 21/34* (2013.01)

(58) Field of Classification Search
CPC ............... G01C 21/34; G01C 21/3484; G01C 21/3415; G01C 21/3641
See application file for complete search history.

(56) References Cited

U.S. PATENT DOCUMENTS

| | | | | |
|---|---|---|---|---|
| 6,321,161 B1 * | 11/2001 | Herbst | ............... | G01C 21/3415 340/905 |
| 6,594,580 B1 * | 7/2003 | Tada | ...................... | G01C 21/26 340/990 |
| 8,068,981 B2 * | 11/2011 | Liberto | ............... | G01C 21/3415 340/993 |
| 8,620,532 B2 | 12/2013 | Curtis et al. | | |
| 2001/0005809 A1 * | 6/2001 | Ito | ...................... | G01C 21/3415 701/411 |
| 2002/0111736 A1 * | 8/2002 | Chowanic | .......... | G01C 21/3484 701/424 |
| 2004/0102896 A1 * | 5/2004 | Thayer | ................... | G08G 1/207 701/522 |
| 2004/0204846 A1 * | 10/2004 | Yano | .................. | G01C 21/3415 701/411 |
| 2005/0021227 A1 * | 1/2005 | Matsumoto | ........ | G01C 21/3415 701/431 |
| 2006/0031007 A1 * | 2/2006 | Agnew | ............... | G01C 21/3492 701/423 |
| 2006/0217879 A1 * | 9/2006 | Ikeuchi | .................. | G01C 21/32 701/409 |

(Continued)

FOREIGN PATENT DOCUMENTS

WO     2009108458 A2     9/2009

OTHER PUBLICATIONS

"DeLorme Community" DeLorme Forums—GPS, Topo & Street Mapping Software and XMap GIS, provided by inventor in Disclosure dated Oct. 15, 2013, © 2000, 2002, 2005, 2007 phpBB Group, <http://forum.delorme.com/viewtopic.php?p=18474>.

(Continued)

*Primary Examiner* — Jonathan M Dager
(74) *Attorney, Agent, or Firm* — Edward J. Lenart; Grant A. Johnson; Kennedy Lenart Spraggins LLP

(57) ABSTRACT

Traffic patterns are monitored for adherence of a user to a suggested route. Deviations from suggested routes are recorded for later upload and/or analysis. Repeated deviations by one, or more, users following similar navigation routes are identified for possible changes in maps and/or routing algorithms.

20 Claims, 5 Drawing Sheets

(56) References Cited

U.S. PATENT DOCUMENTS

| | | | | |
|---|---|---|---|---|
| 2007/0088502 | A1* | 4/2007 | Oumi | G01C 21/3641 701/417 |
| 2009/0164119 | A1* | 6/2009 | Sakata | G08G 1/096844 701/533 |
| 2009/0326798 | A1* | 12/2009 | Insolia | G01C 21/3492 701/533 |
| 2010/0256903 | A1* | 10/2010 | Johnson | G01C 21/3415 701/533 |
| 2011/0202271 | A1* | 8/2011 | Kruithof | G01C 21/32 701/533 |
| 2011/0288762 | A1* | 11/2011 | Kuznetsov | G01C 21/32 701/532 |
| 2012/0046860 | A1* | 2/2012 | Curtis | G06Q 30/0282 701/418 |
| 2012/0078493 | A1* | 3/2012 | Schunder | G01C 21/32 701/117 |
| 2012/0101728 | A1* | 4/2012 | Kudo | G01C 21/3461 701/540 |
| 2012/0283944 | A1* | 11/2012 | Haavasoja | G01C 21/32 701/411 |
| 2013/0173879 | A1* | 7/2013 | Suzuki | G06F 12/02 711/165 |
| 2013/0226455 | A1* | 8/2013 | Hayashida | G08G 1/096844 701/533 |
| 2013/0304382 | A1* | 11/2013 | Nomoto | G01C 21/26 701/533 |
| 2013/0332069 | A1 | 12/2013 | Schunder et al. | |
| 2014/0046594 | A1* | 2/2014 | Watanabe | G08G 1/0112 701/533 |
| 2014/0052370 | A1* | 2/2014 | Watanabe et al. | 701/428 |
| 2014/0062790 | A1* | 3/2014 | Letz | H04L 67/1095 342/386 |
| 2014/0200805 | A1* | 7/2014 | Modica | G01C 21/20 701/466 |
| 2015/0262435 | A1* | 9/2015 | Delong | G07C 5/0816 340/439 |

OTHER PUBLICATIONS

"GPS.gov: Address, Route, & Map Problems on Navigation Devices", Official U.S. Government information about the Global Positioning System (GPS) and related topics, Page last modified on Feb. 11, 2014, <http://www.gps.gov/support/user/mapfix/>.

"Map Insight", Tele Atlas® Map Insight™, provided by inventor in Main Idea of Disclosure dated Oct. 15, 2013, <http://mapinsight.teleatlas.com/mapfeedback/help/faqEN.html>.

"Map Problems in Waze Map Editor", waze, page last modified Apr. 13, 2014, <https://wiki.waze.com/wiki/Map_Problems_in_Waze_Map_Editor#Suggested_route_frequently_ignored>.

"NAVTEQ Map Reporter", provided by inventor in Main Idea of Disclosure dated Oct. 15, 2013, <https://mapreporter.navteq.com/>.

* cited by examiner

MONITORING SUGGESTED ROUTES FOR DEVIATIONS

FIELD OF THE INVENTION

The present invention relates generally to the field of route navigation and more particularly to monitoring suggested routes for route deviations.

BACKGROUND OF THE INVENTION

Navigation devices, such as GPS-enabled devices, contain maps that are referenced by routing software to determine a route to a desired destination. Navigation devices may have capabilities including: providing maps, including streets maps, displayed in human readable format via text or in a graphical format; turn-by-turn navigation directions to a human in charge of a vehicle or vessel via text or speech; providing directions directly to an autonomous vehicle, such as a robotic probe. As traffic patterns change the available maps become out of date. Navigation devices, as discussed herein, are used according to the current state of the art, that is, the user selects a destination, the position system computes a recommended route, and the device presents directions for the user to follow. In general, the user follows route directions without deviation.

The current state of the art is that satellite-based communication from GPS satellites to GPS devices is one way. It is known to provide websites where a user reports changes in traffic patterns and new roads. It is known to download updated maps via the internet for use by a navigation device.

Turn-by-turn navigation is a feature of some navigation devices where directions for a selected route are continually presented to the user in the form of spoken and visual instructions. Turn-by-turn systems typically use an electronic voice to inform the user whether to turn left or right, the street name, and how much distance to the turn.

It is known to notify a user when most users have not followed a suggested route. Such a notice provides a user with an opportunity to look for missing connections or incorrect turn restrictions, which may have caused a suggested route to not be the route that most users actually took.

SUMMARY

Embodiments of the present invention disclose a method, computer program product, and system use with a vehicle that travels actual routes and is equipped with a navigation device that recommends suggested routes. A first computer system receiving a first suggested route. The first computer system detecting a first deviation between the first suggested route and a first actual route. The first computer system storing a first deviation data related to the first deviation.

DETAILED DESCRIPTION

Figure 1:
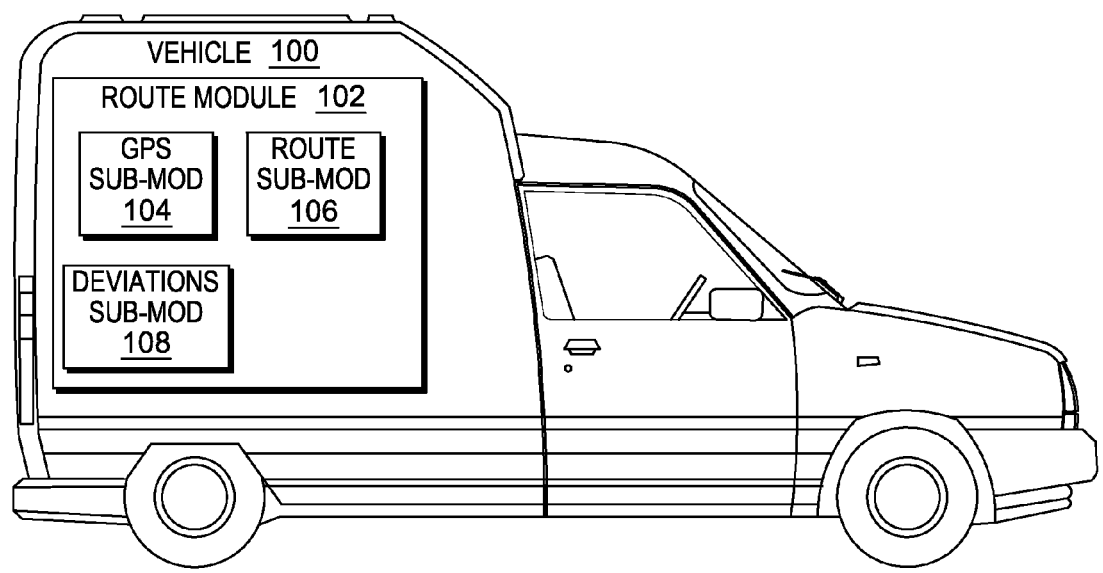
FIG. 1 is a schematic view of a first embodiment of a system according to the present invention.

Traffic patterns are monitored for adherence of a user to a suggested route. Deviations from suggested routes are recorded for later upload and/or analysis. Repeated deviations by one, or more, users following similar navigation routes are identified for possible changes in maps and/or routing algorithms. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of vehicle program 100, in accordance with one embodiment of the present invention, including: route module 102; global positioning system (GPS) sub-module 104; route sub-module 106; and deviations sub-module 108.

In this example, route module 102 is part of vehicle program 100 and contains each sub-module. Alternatively, a navigation device (not shown), independent of the vehicle program, contains GPS 104 and route sub-module 106, while a separate device (not shown) contains deviations sub-module 108, which receives location and route data from the navigation device. Alternatively, any combination of sub-modules may be contained in a stand-alone, portable device.

GPS sub-module 104 operates according to conventional GPS receivers in that it receives location information for vehicle program 100 according to satellite-based communication. Alternatively, another location program is employed, such as ground-based positioning systems, radio beacons, and/or sonar systems.

Route sub-module 106, operates to determine a suggested route when provided with a destination. In this embodiment, route module determines a suggested route with reference to a navigation map (not shown), and by applying navigation algorithm(s) for identifying a suggested route. Alternatively, route sub-mod 106 refers to a pre-defined set of routes originating from a single point. The suggested route being one of the pre-defined routes.

Deviations sub-module 108, operates to compare a suggested route to an actual route for identification of a route deviation and to store deviation data. A more detailed discussion of the deviations sub-module and its various components is found below.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Vehicle program 100 operates to provide recommended traveling routes to a user, and to monitor the user's adherence to the recommended route. In some embodiments of the present invention, turn-by-turn navigation is provided to the user. The vehicle program further operates to record user deviations from the recommended routes.

Some embodiments of the present invention recognize the following facts, potential problems, and/or potential areas for improvement with respect to the current state of the art: (i) it is advantageous for the navigation service, or the navigation device representative who maintains navigation maps, to become aware of changes to a traffic pattern as soon as possible; (ii) not every failure of the user to follow route directions is an indication of a traffic pattern change; (iii) navigation device users who encounter a traffic pattern change that affects them locally, are more likely than long distance travelers, to connect their navigation devices to a computer USB port and attempt to update the local maps via an internet connection; (iv) a navigation device user will occasionally not follow the recommended route instructions; (v) a navigation device user will periodically connect the navigation device to a computer (e.g., via USB) and visit the navigation service provider's (or navigation device manufacturer's) website to download a map update; (vi) when a valid route is removed from service, the user may not follow a recommended route, but may follow another route available in the current map data; and (vii) suggested routes may no longer be valid because of a permanent change in the road system.

The following discussions of embodiments may be better understood with an introductory use case. In this example, the traffic pattern on North Street recently changed at the intersection of West Street and North Street. Prior to the change, a commuter leaving Happy Acres and heading westward on West Street could turn left to go south on North Street. Due to the new traffic patterns, only right turns can be made from West Street. Drivers who wish to go south on North Street must head northward and make a u-turn at a designated u-turn lane to go south on North Street. The drivers following navigation service instructions would likely become confused when the instructions provided call for a left turn at this location where only right turns can be made. Ideally, a navigation map is updated promptly when traffic patterns change.

Some embodiments of the present invention provide for navigation service providers to recognize a user's failure to follow a recommended route. That is, a navigation device user driving westward on West Street may log a route deviation regarding the user's failure to turn left, as recommended by the navigation service. The repeated failure of device owners heading west on West Street to turn left onto North Street would prompt the navigation service provider to update the map, and/or routing algorithm, so that the routing system no longer recommends that westbound traffic take a left onto North Street.

Some embodiments of the present invention relate to navigation devices, and specifically to the ability of a navigation device to report changes in traffic patterns and/or traffic regulations that act to invalidate a previously known portion of a reference map for determining a recommended route. Navigation devices include, for example: stand-alone navigation devices, smartphones having navigation capability, and/or navigation devices installed into vehicles. Although GPS devices are not usually connected to a network, these devices may be temporarily connected to a network. For example, the owner of a GPS device may wish to update a corresponding navigation module and/or maps contained within the device. Conventional approaches include the use of a USB cable (not shown) to connect the GPS device to a personal computer (not shown), which in turn may be connected to a network via an Ethernet or telephone modem (not shown). Accordingly, a manager software, running on the personal computer, oftentimes will handle the tasks of: (i) identifying the connected GPS device; (ii) determining which management functions (such as updating an image) are desired; (iii) connecting to a remote server to acquire a new software or map image; and/or (iv) downloading the image from the remote server to the GPS device.

A suggested route may be repeatedly disregarded under the same circumstances, such as: (i) same intersection; (ii) same direction of travel; and/or (iii) same suggested turn. Repeated instances of deviations from any recommended route, whether by an individual user or many users, serve as an indication that a map previously known to be valid may no longer be valid. Circumstances that cause a change in traffic patterns include, but are not limited to: (i) mandatory detours; (ii) permanently changed traffic patterns; (iii) changed regulations; (iv) a congested route; (v) an accident; (vi) last-minute changes in plans; and/or (vii) a non-scheduled break for a meal.

Figure 2:
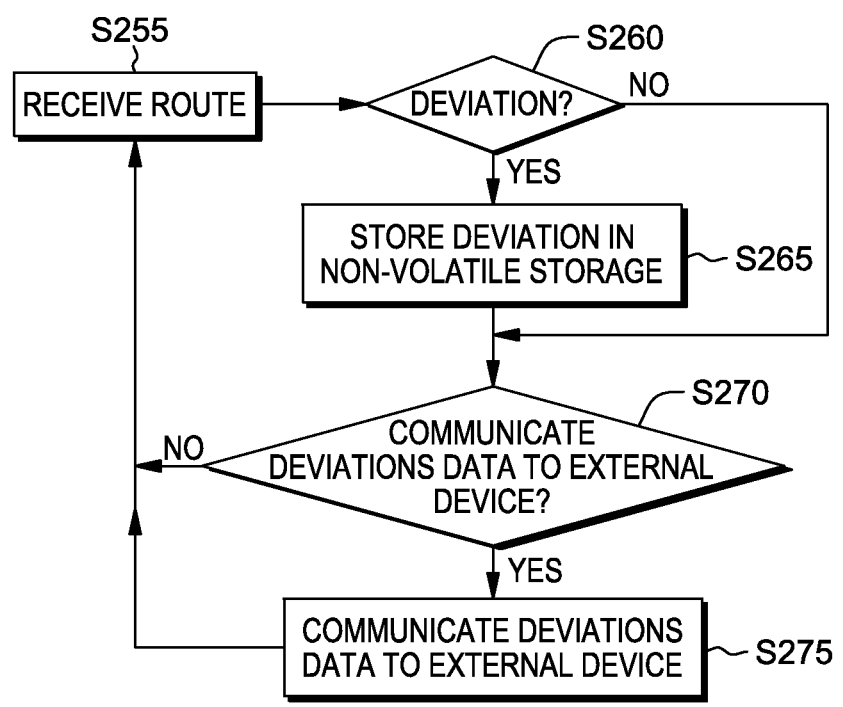
FIG. 2 is a flowchart showing a method performed, at least in part, by the first embodiment system.
Figure 3:
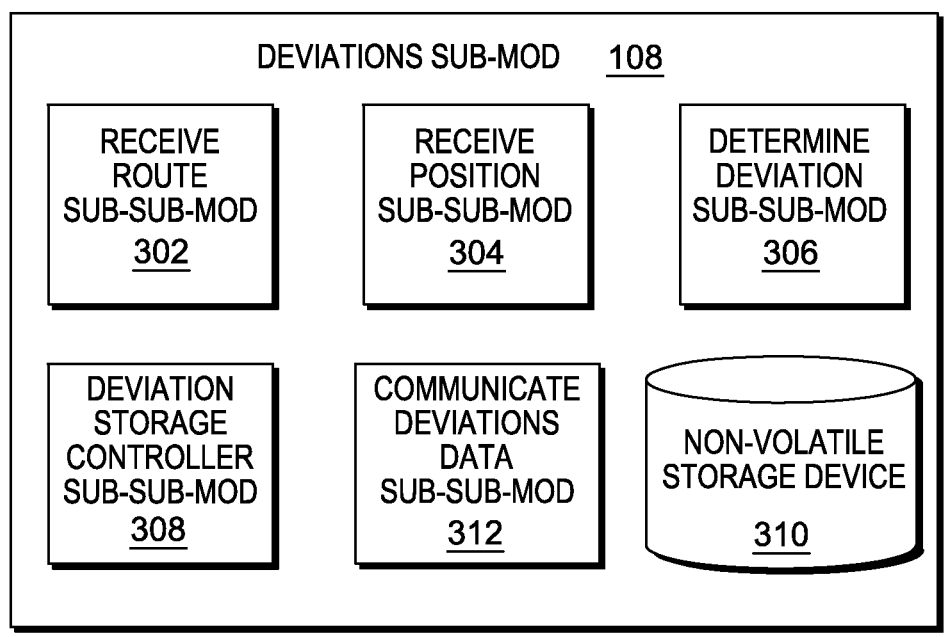
FIG. 3 is a schematic view of a machine logic (for example, software) portion of the first embodiment system.

FIG. 2 shows flowchart 250 depicting a first method according to the present invention. FIG. 3 shows deviations sub-mod 108 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where receive route sub-sub-module (SSM) 302 receives a suggested route. In this example, a user inputs a destination and route sub-mod 106 determines the suggested route based on the user's location according to GPS data, received from GPS sub-mod 104. This suggested route is provided to deviations sub-module 108 via receive route SSM. Alternatively, a destination is provided to the route sub-mod over a network by a third party. For example, a delivery service may send destination data to the route sub-module of a delivery vehicle.

Processing proceeds to decision step S260, where determine deviation SSM 306 determines when a deviation occurs with respect to the suggested route. A deviation from the suggested route by an actual route is known by monitoring the actual location of vehicle 100. Receive position SSM 304 receives GPS positioning data from GPS sub-mod 104. In this example, the determine deviation SSM compares the position data of the vehicle on an actual route, with a suggested position on the suggested route to identify any locations where the actual position does not match the suggested position. If no deviation is determined, processing proceeds through the "no" branch to step S270, discuss below.

If a deviation is determined, processing proceeds through the "yes" branch to step S265, where deviation storage controller SSM 308 stores deviation data in non-volatile storage on non-volatile storage device 310. Non-volatile storage is used so that when power is down, the stored data is maintained for later reference. In some embodiments, relatively permanent storage is used. (See definition of "relatively permanent storage" below.) In this embodiment, storage is located in deviations sub-module 108. Alternatively, non-volatile storage is on a plug-in memory card, facilitating a physical transfer of the deviation data storage.

Processing proceeds to step S270, where communicate deviations data SSM 312 determines whether a communicate condition exists for communicating deviations data to an external device. In this example, a communication condition occurs when deviations sub-mod 108 is in electrical communication with a designated external device, such as an authorized flash memory drive. Alternatively, a communication condition occurs when the sub-module is in wired or wireless communication with a designated internet website. Alternatively, a communication condition occurs when a user initiates the communication of deviations data. In that way, additional privacy is provided to the user where the user may be concerned about the spread, or public availability, of the user's vehicle location data. If no communication condition exists, processing proceeds through the "no" branch, returning to step S255.

If a communication condition exists, processing proceeds through the "yes" branch to step S275, where communicate deviations data SSM 312 communicates deviations data to an external device (not shown). Deviations data may include, and is not limited to: (i) where the deviation occurs; (ii) which direction the user is headed, (iii) which suggested turn was not followed; (iv) other metadata that is useful in helping to analyze and understand the deviation data; (v) the model number of the specific navigation device; and/or (vi) the version number of software that determined the suggested route. In this example, deviation data is communicated over a network via wireless communication. Alternatively, the deviation data is communicated to a flash memory drive. In that way, the user is better able to limit access where vehicle location privacy is a concern. Alternatively, the deviation data is communicated over wired communication with a user's personal computer.

Figure 4:
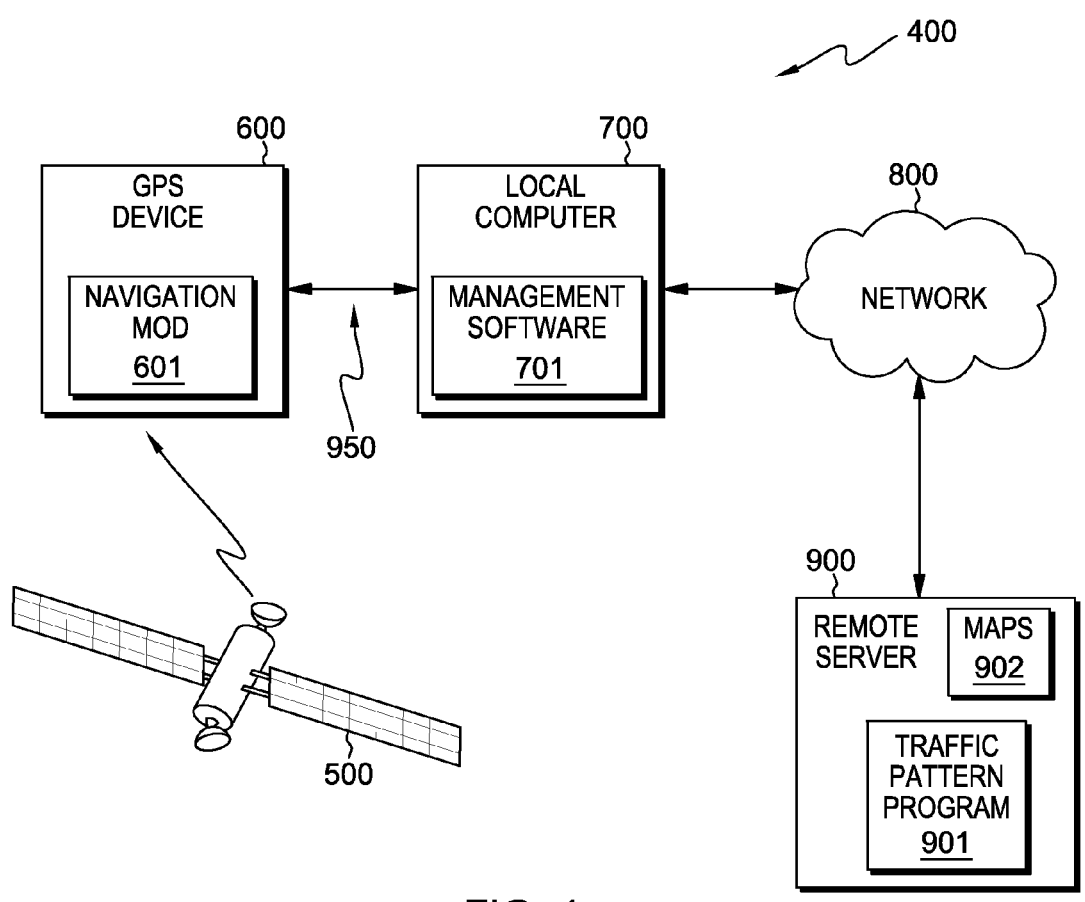
FIG. 4 is a schematic view of a second embodiment of a system according to the present invention.
Figure 5:
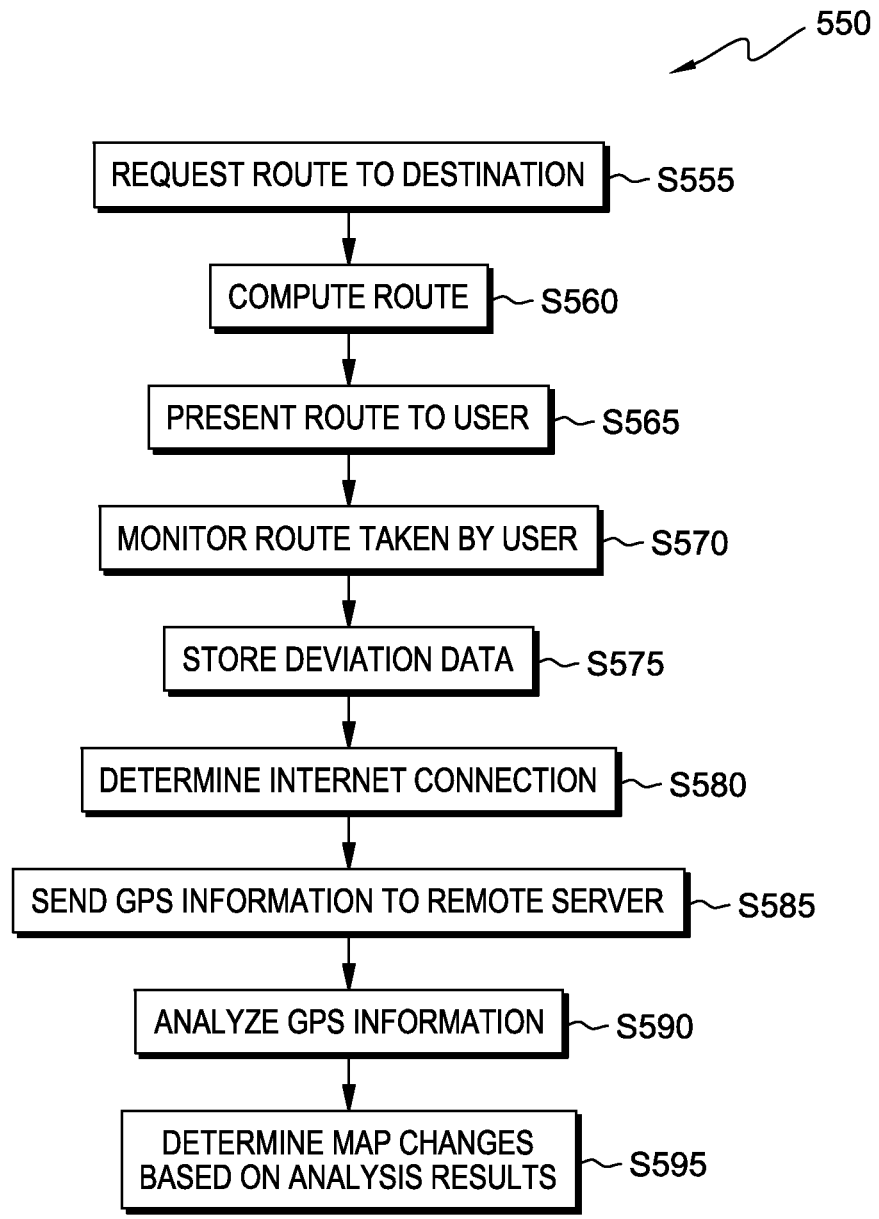
FIG. 5 is a flowchart showing a method performed, at least in part, by the second embodiment system.

The present invention will further be described in detail with reference to FIGS. 4 and 5. FIG. 4 is a functional block diagram illustrating various portions of system 400, in accordance with an embodiment of the present invention, including: satellites 500; global positioning sub-system (GPS) 600; software navigation module 601; client computer sub-system 700; GPS management module 701; network 800; remote server sub-system 900; traffic pattern module 901; and map store 902. FIG. 5 shows flowchart 550 depicting a first method according to the present invention. Example methods and associated software will now be discussed, over the course of the following paragraphs, with extensive reference to FIG. 5 (for the method step blocks) and FIG. 4 (for the software blocks). In the embodiment of system 400, the GPS is temporarily connected to the local computer, which is not a permanent connection.

Processing begins at step S555, where a route request is received by navigation module 601 of GPS device 600. Most of the time the GPS device operates in stand-alone mode, only receiving a signal one-way from satellites 500. According to conventional practices and typically while disconnected from any other electronic device and/or internet connection, a user inputs a set of travel plans for the GPS device to compute a recommended route to be travelled.

Processing proceeds to step S560, where software navigation module 601 computes recommended routes based upon the owner's stated destination and according to maps stored within the GPS (not shown). During the course of normal usage (and generally while disconnected from any other device) the navigation module computes recommended routes based upon the users stated travel plans.

Processing proceeds to step S565, where GPS device 600 presents the recommended routes to the user of the GPS device. During conventional operation, the user will attempt to follow one of the recommended routes. In this example, a number of recommended routes are provided and the user selects one of those routes to follow. Alternatively, only one route is provided to the user, and the user attempts to follow that route.

Processing proceeds to step S570, where navigation module 601 monitors the route taken by the user. In some instances, the user will not follow the turn-by-turn route directions exactly as provided by the GPS device. Each time that the user deviates from the recommended route the navigation module takes note of the deviation by recording the deviation data that may include one, or more, of the following: (i) where the deviation occurs; (ii) which direction the user is headed, and/or (iii) which suggested turn was not followed.

Processing proceeds to step S575, where navigation module 601 stores the deviation data. In this example, deviation details are stored in memory (not shown) within GPS device 600. Alternatively, deviation data is stored on a flash drive attached to the GPS device. Alternatively, and where remote electronic communication is available, deviation data is stored in memory of a remote computer sub-system, such as computer sub-system 700. Repeated route deviations, under the same circumstances, may in some embodiments result in duplicate entries recording the deviation, and may in other embodiments increment a count associated with the specific deviation.

Processing proceeds to step S580, where GPS device 600 determines that an internet connection exists. Sporadically, when the GPS device is connected, for example, to local computer 700, it will be recognized by GPS specific management software 701 running on that the local computer. In this example, when GPS device 600 is connected to the local computer having an internet connection, a connection to remote server 900 is established. Alternatively, a user initiates electronic communication between the remote server and the computer-attached GPS device. Alternatively, the GPS device recognizes a wireless connection to the local computer and corresponding GPS management software supporting access to the remote server.

Processing proceeds to step S585, where GPS management module 701 sends GPS information, including a collected set of deviations, to remote server 900 over network 800. During conventional usage, GPS device 600 is occasionally connected to another computer, such as local computer sub-system 700, via a cable, Blue Tooth, WiFi, or other suitable connection medium 950. The GPS specific management software running on the local computer detects the GPS device and presents menu options for management tasks including: (i) updating the maps; (ii) updating the GPS software image; and/or (iii) changing appearance of user screens. The electrically connected computer may also connect via network infrastructure 800 to remote server 900. In this example, the remote server 900 is set up and operated by (or on behalf of) the GPS device manufacturer. Alternatively, a navigation service owns and operates the remote server.

In addition to other management tasks that the user intended to perform, the list of deviations recorded within GPS device 600 may be sent to the remote server (in its entirety or after applying some filtering rules to reduce the amount of data, for example, by only sending deviations that have occurred at least twice. The GPS information sent to the remote server may include, and is not limited to: (i) collected deviation data; (ii) other metadata that is useful in helping to analyze and understand the deviation data; (iii) the model number of the specific GPS device; (iv) the version number of its software image; and/or (v) version number(s) of the map(s).

Conventionally, the remote server 900 serves as a repository for new map images via storage, such as maps store 902. In addition to map images, other items associated with and needed by the GPS device may be stored, for example, an updated software image for GPS device 600 that corrects software bugs.

Processing proceeds to step S590, where traffic pattern module 901 analyzes the GPS information received in step S585. Upon receiving the list of deviations the traffic pattern module analyzes the deviation data. The analysis may consider: (i) specific location, (ii) direction of travel, (iii) alternate turns made, (iv) how many times this GPS deviated in the same way, and/or (v) whether deviation lists from other GPS devices (which have also uploaded deviation lists to the remote server) have included the same specific deviations.

Processing proceeds to step S595, where the analysis of data by traffic pattern module 901 supports determinations to make map changes based on analysis results. In this example, if the data analysis indicates that users routinely deviate from a route suggested by the GPS device then the deviation is elevated in significance. Alternatively, any reported duplicate deviations are ranked as significant. In some embodiments of the present invention, when a significant deviation is determined, the location of the deviation, also referred to as the potential map issue, is alerted to the GPS device manufacturer (or the firm/service provider that provides map databases for the GPS device).

Upon receiving notification that a potential map issue exists, the entity responsible for the map database may investigate and create an appropriate change to the map database. The investigation may include (but is not limited to): (i) obtaining new satellite imagery; (ii) studying new satellite imagery, (iii) sending a vehicle or person to the specific location to study the situation; (iv) modifying route generation software (where, for example, software bugs are identified); and/or (iv) accepting the information reported by multiple users and taking an appropriate action. Changing the map database may be done in many different ways; however, in general, the change eventually results in one, or more, new maps being made available to GPS device 600 from map store 902 via remote server 900.

Some embodiments of the present invention support GPS-based mapping and route recommendations. Identification of a GPS route that is no longer valid is achieved by detecting instances where users do not follow a portion of a recommended route. Some embodiments of the present invention determine an invalid route by identifying similar deviations of a route portion from more than one vehicle. Programs based on embodiments of the present invention: (i) collect details regarding the portion of the recommended route not followed and the alternative route portion that was taken (ii) analyze the number of occurrences and details of when the deviations take place, where they take place, and what directions are being deviated from; and/or (iii) suggest that some portion of the reference map database should be considered for an update.

An exemplary embodiment that applies a count system for determining a repeated deviation follows. Conventional GPS-based navigation systems recompute the recommended route for a user when the user fails to follow the navigation instructions/directions. Some embodiments of the present invention take additional actions when directions are not followed, such as making an entry in a deviations log to record: (i) the specific location of the deviation; and (ii) the specific navigation instruction that was not followed. For example, did not make left turn onto North Street from West Street. Further, an initial count for the route deviation is recorded with a value of one. Each time the same driver makes the same route deviation, the repeated deviation module increments the deviation count by one. If the route deviation is merely a failure to follow directions because the vehicle was briefly in the wrong lane or other transient situations, it is not likely that the deviation count for that deviation will be incremented often. If the route deviation is due to a permanently changed traffic pattern, then a single vehicle may make the same deviation repeatedly, and many other vehicles will likely make the same deviation.

Periodically (and more likely in the case where a map update is deemed appropriate due to local traffic pattern changes) a user accesses the internet with the user's GPS navigation device to visit the GPS manufacturer website and download a map update. In some embodiments of the present invention, when a user attempts to download a map update to the user's GPS navigation device any collected route deviation data is uploaded at that time and the deviations log is cleared.

Once uploaded to the manufacturer's website, the manufacturer analyzes the collected deviation data provided by numerous users to determine where repeated route deviations occur. Route deviations with low counts from individual devices, and that are not repeated by other devices, are ignored. Deviations with high counts from a single device, and that also appear in deviation data collected from other devices, may require prompt attention from the manufacturer, or service provider. Oftentimes, a service provider will be able to resolve repeated deviation inquiries by: (i) checking state department of transportation websites; (ii) reviewing recent satellite data; and/or (iii) sending someone to the location to determine if a traffic change has actually occurred.

Intelligent filtering of the collected deviation data by the GPS device may include the following: (i) deviations with a count value below a pre-defined threshold may be ignored; (ii) when the GPS device is detected at a previously-logged route deviation, but successfully follows the recommended route, the count for that route deviation is reset to zero; (iii) when the GPS device is detected at a previously-logged route deviation, but successfully follows the recommended route, the route deviation is erased. Successfully following a recommended route through a location that was previously logged as a deviation implies that the previously recorded route deviation is not related to a permanent traffic pattern change. Additional information, or deviation data, may be collected, such as the time of day for a route deviation, to identify periodic route changes due to construction times, reduced speed school zone hours, etc.

Some embodiments of the present invention may include one, or more, of the following features, characteristics and/or advantages: (i) allows a GPS to automatically record likely candidate locations for traffic pattern changes and to report them back to the manufacturer; (ii) dynamically adjusts recommended routes according to apparent route availability; (iii) removes a known route from the map database due to reports of users not following a recommended route; (iv) temporarily hides a known route from the map database due to reports of users not following a recommended route; (vii) suggests and/or automatically updates the reference maps used by the GPS device to recommend routes; and/or (viii) actively notifies a responsible party of probable changes to be made to a reference map.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices, microcontrollers, microprocessors, and GPS devices.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Traffic: the movement of people that may involve travel by foot, bicycle, automobile, train, boat, airplane, or other modes of transportation.

Navigation device: smart phone, motor vehicle, or other devices having location-detecting capability, such as: gunfire locators, radio beacons, sonar systems, and/or other position detection and/or reporting systems now known or to be developed in the future. A navigation device further includes locally-stored maps and routing algorithm(s).

Navigation route: the directions for traversing a course of identified paths associated with a geographic map.

Similar navigation directions/instructions: for two or more navigation routes including a current location and a destination, the same movement instructions at a location common to each navigation route and/or segments of an identified path to be traversed that is common to each navigation route are considered to be similar navigation directions and/or navigation instructions. One example of similar navigation directions/instructions are two identical navigation routes (these similar navigation directions/instructions are also referred to as the "same" navigation routes.

Deviation: a failure to follow a specific route suggestion, such as failure to make a left turn at a specific intersection.

Relatively permanent storage: includes non-volatile storage, and volatile storage where data is not lost even over relatively long periods of non-operation of the volatile storage device, on which the data is "relatively permanently stored."

What is claimed is:

1. A method for use with a vehicle that travels actual routes and is equipped with a navigation device that recommends suggested routes, the method comprising:
   receiving a first suggested route from the navigation device;
   detecting a first deviation between the first suggested route and a first actual route traveled by a vehicle; and
   storing a first deviation data related to the first deviation at the navigation device;
   detecting a second actual route traveled by the vehicle, the second actual route including following the first suggested route past the first deviation; and
   based at least in part on the second actual route following the first suggested route past the first deviation, resetting a counter associated with the first deviation data; and
   filtering of collected deviation data including the first deviation data by ignoring logged route deviations based at least in part on a counter value being below a threshold.

2. The method of claim 1, wherein the first deviation data is stored in a relatively permanent manner.

3. The method of claim 1, wherein the first deviation data is stored in a local memory of the navigation device.

4. The method of claim 1, wherein:
   the detection of the first deviation includes:
      receiving vehicle position data from a satellite-based global positioning system (GPS); and
      determining the first deviation by comparing the vehicle position data to the first suggested route.

5. The method of claim 1, further comprising:
   detecting a plurality of deviations between a plurality of suggested routes and a plurality of actual routes;
   storing a set of deviation data related to the plurality of deviations; and
   determining a set of repeated route deviations based, at least in part, on the plurality of deviations.

6. The method of claim 5, further comprising:
   communicating the set of repeated route deviations to an external device.

7. The method of claim 1, further comprising:
   communicating the first deviation data to an external device, wherein the first deviation data is displayed on a display device.

8. The method of claim 1, wherein the first deviation data includes one, or more, of the following: where the first deviation occurred, which direction a user is moving during the first deviation, the time of day of the first deviation, which suggested turn was not followed by the first deviation, a model number of the navigation device, and/or a version number of a map on which the first suggested route is based.

9. A computer program product for use with a vehicle that travels actual routes and is equipped with a navigation device that recommends suggested routes, the computer program product including a computer readable storage medium, the computer program product comprising computer program instructions that, when executed by one or more processors, cause a computing device to perform operations comprising:
   receiving a first suggested route from a navigation device;
   detecting a first deviation between the first suggested route and a first actual route traveled by a vehicle; and
   storing a first deviation data related to the first deviation;
   detecting a second actual route traveled by the vehicle, the second actual route including following the first suggested route past the first deviation; and
   based at least in part on the second actual route following the first suggested route past the first deviation, resetting a counter associated with the first deviation data; and
   filtering of collected deviation data including the first deviation data by ignoring logged route deviations based at least in part on a counter value being below a threshold.

10. The computer program product of claim 9, wherein the first deviation data is stored in a relatively permanent manner.

11. The computer program product of claim 9, wherein the first deviation data is stored in a local memory of the navigation device.

12. The computer program product of claim 9, wherein:
   detecting the first deviation between the first suggested route and the first actual route includes:
      receiving vehicle position data from a satellite-based global positioning system (GPS); and
      determining the first deviation by comparing the vehicle position data to the first suggested route.

13. The computer program product of claim 9, further comprising:
   detecting a plurality of deviations between a plurality of suggested routes and a plurality of actual routes;
   storing a set of deviation data related to the plurality of deviations; and determining a set of repeated route deviations based, at least in part, on the plurality of deviations.

14. The computer program product of claim 13, further comprising:
communicating the set of repeated route deviations to an external device.

15. The computer program product of claim 9, further comprising:
communicating the first deviation data to an external device, wherein the first deviation data is displayed on a display device.

16. The computer program product of claim 9, wherein the first deviation data includes one, or more, of the following: where the first deviation occurred, which direction a user is moving during the first deviation, the time of day of the first deviation, which suggested turn was not followed by the first deviation, a model number of the navigation device, and/or a version number of a map on which the first suggested route is based.

17. A computer system for use with a vehicle that travels actual routes and is equipped with a navigation device that recommends suggested routes, the computer system comprising one or more computer processors, a computer readable storage medium operatively coupled to the one or more computer processors, the computer readable storage medium having disposed within it computer program instructions that, when executed by the computer processor, cause the computer system to perform operations comprising:
receiving a first suggested route;
detecting a first deviation between the first suggested route and a first actual route; and
storing a first deviation data related to the first deviation;
detecting a second actual route traveled by the vehicle, the second actual route including following the first suggested route past the first deviation; and
based at least in part on the second actual route following the first suggested route past the first deviation, resetting a counter associated with the first deviation data; and
filtering of collected deviation data including the first deviation data by ignoring logged route deviations based at least in part on a counter value being below a threshold.

18. The computer system of claim 17, wherein the first deviation data is stored in a relatively permanent manner.

19. The computer system of claim 17, wherein the first deviation data is stored in a local memory of the navigation device.

20. The computer system of claim 17, wherein the first deviation data includes one, or more, of the following: where the first deviation occurred, which direction a user is moving during the first deviation, the time of day of the first deviation, which suggested turn was not followed by the first deviation, a model number of the navigation device, and/or a version number of a map on which the first suggested route is based.

* * * * *